(12) United States Patent
Kamiya (10) Patent No.: US 8,015,074 B2
(45) Date of Patent: Sep. 6, 2011

(54) COMMODITY ORDER ISSUING AND ACCEPTING METHOD, SYSTEM THEREOF, AND COMMODITY ORDER ACCEPTING APPARATUS

(75) Inventor: Hiroshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 1541 days.

(21) Appl. No.: 09/782,017

(22) Filed: Feb. 14, 2001

(65) Prior Publication Data

US 2001/0014871 A1 Aug. 16, 2001

(30) Foreign Application Priority Data

Feb. 16, 2000 (JP) ................................. 2000-038338

(51) Int. Cl.
*G06Q 30/00* (2006.01)
(52) U.S. Cl. .................. 705/26.4; 705/26.1; 705/26.61; 705/26.62; 705/26.63
(58) Field of Classification Search .................... 705/26, 705/27, 28, 29, 14, 37, 39, 40, 41, 42, 43
See application file for complete search history.

(56) References Cited

U.S. PATENT DOCUMENTS

| | | | | |
|---|---|---|---|---|
| 4,926,325 A * | 5/1990 | Benton et al. | .................... | 705/39 |
| 5,481,094 A * | 1/1996 | Suda | ................................ | 705/14 |
| 5,630,071 A * | 5/1997 | Sakai et al. | ....................... | 705/21 |
| 5,859,414 A * | 1/1999 | Grimes et al. | ................. | 235/383 |
| 5,914,878 A * | 6/1999 | Yamamoto et al. | ........... | 700/106 |
| 6,168,076 B1 * | 1/2001 | Yamamoto et al. | ........... | 235/7 R |
| 6,247,047 B1 * | 6/2001 | Wolff | ............................ | 709/219 |
| 6,314,406 B1 * | 11/2001 | O'Hagan et al. | ................ | 705/14 |
| 6,352,201 B1 * | 3/2002 | Novogrod | ...................... | 235/379 |
| 6,405,174 B1 * | 6/2002 | Walker et al. | .................... | 705/14 |
| 6,477,507 B2 * | 11/2002 | Sugimori | ......................... | 705/26 |
| 6,669,832 B1 * | 12/2003 | Saito et al. | ....................... | 705/26 |

FOREIGN PATENT DOCUMENTS

| | | |
|---|---|---|
| JP | 6-332921 | 12/1994 |
| JP | H8-292981 | 11/1996 |
| JP | H9-204463 | 8/1997 |
| JP | 10-289383 | 10/1998 |
| JP | 11-143959 | 5/1999 |
| JP | 11-149503 | 6/1999 |
| JP | 11-161717 A | 6/1999 |
| JP | H11-328278 | 11/1999 |
| KR | 1998-80935 A | 11/1998 |

OTHER PUBLICATIONS

"Calculating a discounted price", Gerber, Michael, Scholastic DynaMath, Mar. 1998, 16,6 p. 9.*

* cited by examiner

*Primary Examiner* — M. Thein
(74) *Attorney, Agent, or Firm* — Sughrue Mion, PLLC (57) ABSTRACT

A commodity order issuing and accepting method is disclosed in which an order issuer requests a first electronic document having first input fields for order issuer information and for commodity order issuance information except for a payment date to an order accepter; the order accepter transmits the first electronic document to the order issuer; the order issuer fills the first input fields; the order issuer transmits the filled information to the order accepter; the order accepter retrieves a transaction condition corresponding to the commodity order issuance information except for the payment date; the order accepter transmits a second electronic document on which the transaction condition is described and which has a second input field for the payment date to the order issuer; the order issuer inputs the payment date to the second input field; and the order issuer transmits the payment date to the order accepter.

43 Claims, 5 Drawing Sheets

HTML DOCUMENT A
401

| ORDER ISSUER'S NAME | [_____] 403 |
| ORDER ISSUER'S ADDRESS | [_____] 404 |
| ORDER ISSUER'S TELEPHONE NUMBER | [_____] 405 |
| ORDER ISSUER'S E-MAIL ADDRESS | [_____] 406 |
| COMMODITY NAME | [_____▼] 407 |
| COMMODITY QUANTITY | [_____] 408 |
| PAYMENT METHOD | ● CASH  ○ BANK TRANSFER  409 |

[TRANSMIT] 410   [CANCEL] 411

402
FORM A

FIG. 4

HTML DOCUMENT B
501

| | |
|---|---|
| ORDER ISSUER'S NAME | ·ROU YAMADA ~503 |
| ORDER ISSUER'S ADDRESS | ···, CHUO-KU, TOKYO-TO ~504 |
| ORDER ISSUER'S TELEPHONE NUMBER | 03−5△△△−△△△△ ~505 |
| ORDER ISSUER'S E-MAIL ADDRESS | △△△@△△△.ne.jp ~506 |
| COMMODITY NAME | PC△△△△−△△ ~507 |
| COMMODITY QUANTITY | 1 ~508 |
| PAYMENT METHOD | BANK TRANSFER ~509 |
| DELIVERY DATE | 1999/10/20 ~510 |
| REGULAR PRICE | ¥350,000 ~511 |
| MAXIMUM DISCOUNT RATE | 10% ~512 |
| DUE PAYMENT DATE | 1999/11/25 ~513 |

REDUCED PRICE IS CALCULATED BY THIS FORMULA.

REDUCED PRICE = [1 − (DUE PAYMENT DATE − ORDER ISSUER'S PAYMENT DATE) / (DUE PAYMENT DATE − DELIVERY DATE) X MAXIMUM DISCOUNT RATE) X REGULAR PRICE  ~514

INPUT ORDER ISSUER'S PAYMENT DATE.  [515]

[TRANSMIT] 516   [CANCEL] 517

FORM B 502

RETURN 518

FIG.5

HTML DOCUMENT C
601

| | |
|---|---|
| ORDER ISSUER'S NAME | ROU YAMADA ~603 |
| ORDER ISSUER'S ADDRESS | ···, CHUO-KU, TOKYO-TO ~604 |
| ORDER ISSUER'S TELEPHONE NUMBER | 0 3 − 5 △△△ − △△△△ ~605 |
| ORDER ISSUER'S E-MAIL ADDRESS | △△△@△△△.ne.jp ~606 |
| COMMODITY NAME | PC△△△△−△△ ~607 |
| COMMODITY QUANTITY | 1 ~608 |
| PAYMENT METHOD | BANK TRANSFER ~609 |
| DELIVERY DATE | 1999/10/20 ~610 |
| REGULAR PRICE | ¥350,000 ~611 |
| MAXIMUM DISCOUNT RATE | 10% ~612 |
| DUE PAYMENT DATE | 1999/11/25 ~613 |
| ORDER ISSUER'S PAYMENT DATE | 1999/10/25 ~614 |
| REDUCED PRICE | ¥319,861 ~615 |

[ AUTHENTICATE ] ~616

RETURN ~617

602 FORM C

COMMODITY ORDER ISSUING AND ACCEPTING METHOD, SYSTEM THEREOF, AND COMMODITY ORDER ACCEPTING APPARATUS

BACKGROUND OF THE INVENTION

1. Field of the Invention

The present invention relates to a commodity order issuing and accepting method, a system thereof, and a commodity order accepting apparatus, and in particular, to those using the Internet.

2. Description of the Prior Art

As the Internet is becoming common, transactions using the Internet are being performed using a commodity order issuing and accepting system.

However, in a conventional commodity order issuing and accepting system, when an order issuer inputs a commodity name and its quantity, the price is automatically determined. Thus, the order accepter side cannot effectively use the commodity order issuing and accepting system to facilitate the cash flow of the order accepter side.

SUMMARY OF THE INVENTION

The present invention is made from the above-described point of view. An object of the present invention is to provide a commodity order issuing and accepting method, a system thereof, and a commodity order accepting apparatus thereof that facilitate the cash flow on the order accepter side.

Another object of the present invention is to provide a commodity order issuing and accepting method, a system thereof, and a commodity order accepting apparatus thereof that allow the order accepter side to prompt the order issuer side to designate an early payment date so as to facilitate the cash flow on the order accepter side.

According to the present invention, there is provided a commodity order issuing and accepting method, comprising: a step that an order issuer side requests a first electronic document having first input fields for order issuer information and for commodity order issuance information except for an order issuer's payment date to an order accepter side; a step that the order accepter side transmits the first electronic document to the order issuer side; a step that the order issuer side inputs the order issuer information and the commodity order issuance information except for the order issuer's payment date to the first input fields; a step that the order issuer side transmits the order issuer information and the commodity order issuance information except for the order issuer's payment date to the order accepter side; a step that the order accepter side retrieves a transaction condition corresponding to the commodity order issuance information except for the order issuer's payment date; a step that the order accepter side transmits a second electronic document on which the transaction condition is described and which has a second input field for the order issuer's payment date to the order issuer side; a step that the order issuer side inputs the order issuer's payment date to the second input field; and a step that the order issuer side transmits the order issuer's payment date to the order accepter side.

The commodity order issuing and accepting method may further comprises: a step that the order accepter side calculates a reduced price corresponding to the transaction condition and the order issuer's payment date.

The commodity order issuing and accepting method may further comprises: a step that the order accepter side transmits a third electronic document on which the reduced price is described and which has means for inputting an authentication to the order issuer side; a step that the order issuer side activates the means for inputting the authentication; and a step that the order issuer side transmits information representing that the means for inputting the authentication has been activated to the order accepter side.

These and other objects, features and advantages of the present invention will become more apparent in light of the following detailed description of the best mode embodiment thereof, as illustrated in the accompanying drawings.

DESCRIPTION OF PREFERRED EMBODIMENT

Next, with reference to the accompanying drawings, an embodiment of the present invention will be described.

Figure 1:
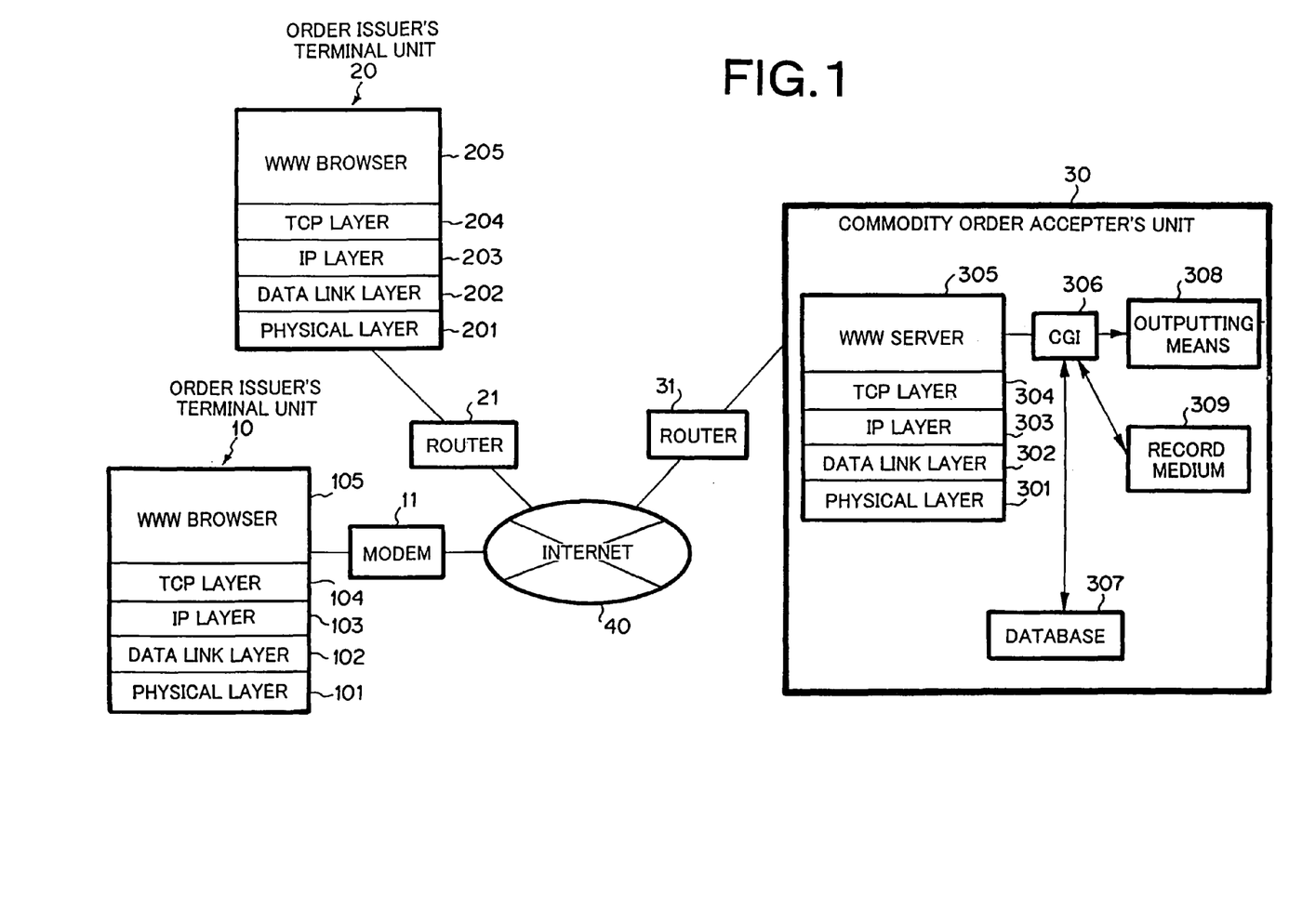
FIG. 1 is a schematic diagram showing the structure of a commodity order issuing and accepting system according to an embodiment of the present invention.

First of all, the structure of the embodiment of the present invention will be described with reference to FIG. 1. The commodity order issuing and accepting system comprises an order issuer terminal unit 10 or 20 and a commodity order accepter unit 30 that are connected through the Internet 40.

The order issuer terminal unit 10 is connected to the Internet 40 through a modem 11. The order issuer terminal unit 20 is connected to the Internet 40 through a router 21. The commodity order accepter unit 30 is connected to the Internet 40 through a router 31.

The order issuer terminal unit 10 comprises a physical layer 101, a data link layer 102, an IP layer 103, a TCP layer 104, and a WWW (World Wide Web) browser 105. Likewise, the order issuer terminal unit 20 comprises a physical layer 201, a data link layer 202, an IP layer 203, a TCP layer 204, and a WWW browser 205.

The commodity order accepter unit 30 comprises a physical layer 301, a data link layer 302, an IP layer 303, a TCP layer 304, a WWW server 305, a CGI (Common Gateway Interface) 306, a database 307, an outputting means 308, and a record medium 309. The outputting means 308 is for example a printer, a display, or the like. The record medium 309 is for example a hard drive, a magneto-optical disc, or the like. Although the database 307 is stored in the record medium 309, the database 307 is separated from the record medium 309 in FIG. 1 for explanation.

The WWW browser 105 or 205 communicates with the WWW server 305 with the HTTP (Hyper Text Transfer Protocol) through the physical layer, the data link layer, the IP layer, and the TCP layer.

Figure 2:
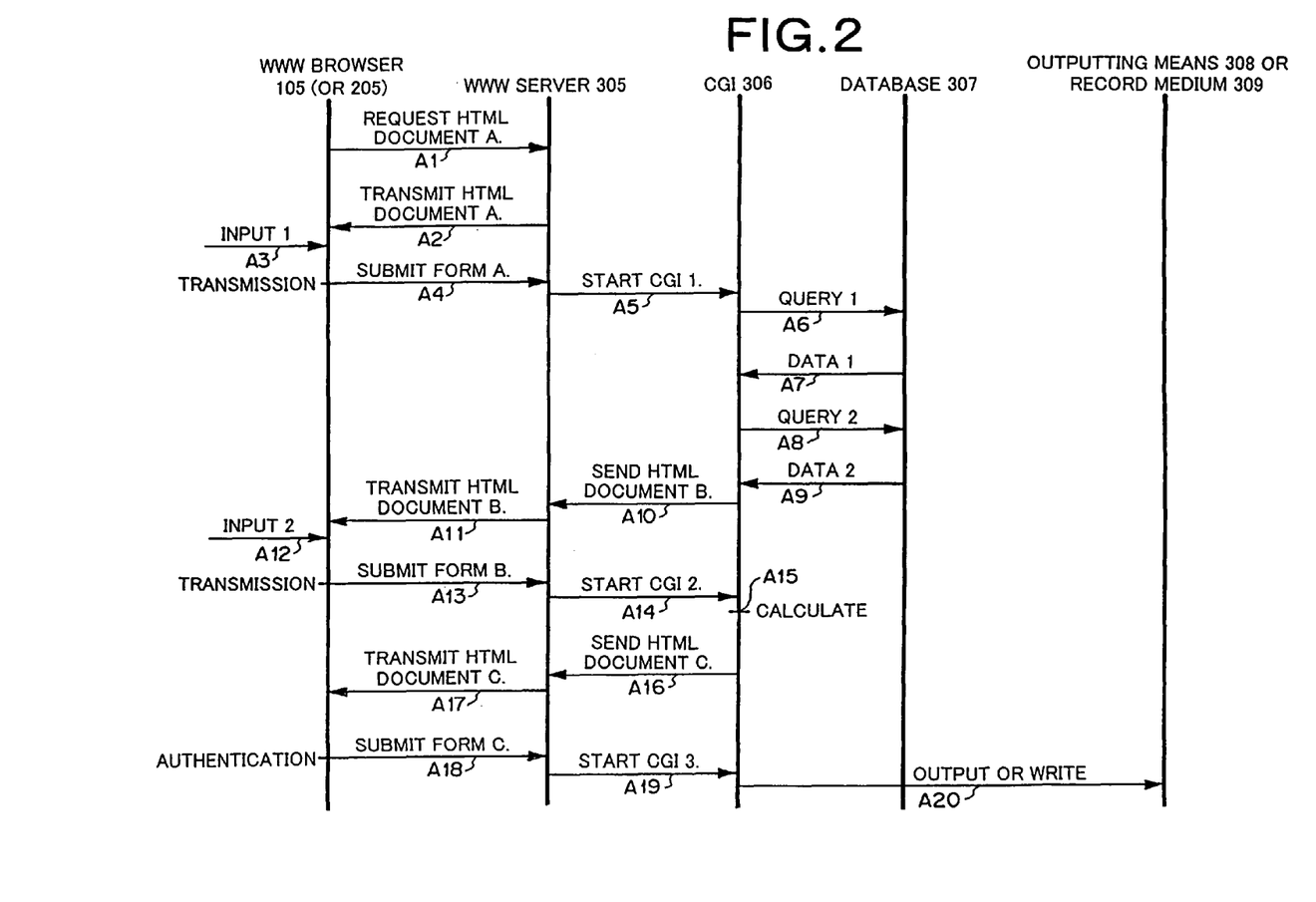
FIG. 2 is a sequence chart showing the operation of the commodity order issuing and accepting system according to the embodiment of the present invention.

Next, with reference to FIGS. 2 to 5, the operation of the embodiment will be described. With reference to FIG. 2, when the URL of HTML document A (401) is directly input to the WWW browser 105 (or 205) or a link to HTML document A (401) is activated, WWW browser 105 (or 205) requests the WWW server 305 for the HTML document A (401) (at step A1).

Figure 3:
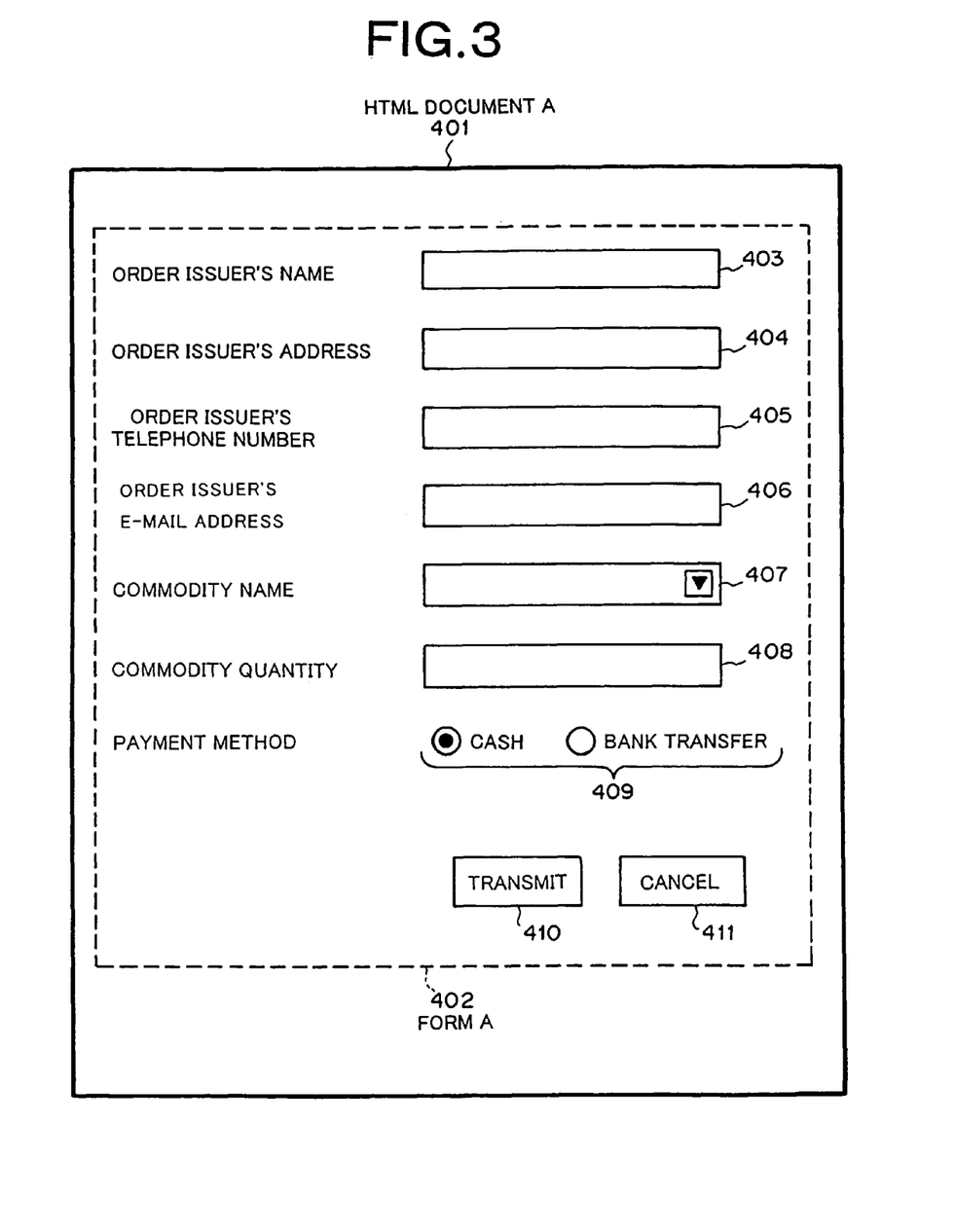
FIG. 3 is a schematic diagram showing an HTML document A according to the embodiment of the present invention.

With reference to FIG. 3, described in the HTML document A (401) is a form A (402). Described in the form A (402) are: order issuer information input fields 403 to 406, which include an order issuer's name, the order issuer's address, the order issuer's telephone number, and the order issuer's e-mail address; commodity order issuance information input fields 407 to 409, which include an order issuance commodity name, an order issuance commodity quantity, and a payment method and which does not include an order issuer's payment date; a submit button 410 named "TRANSMIT"; and a reset button 411 named "CANCEL". In the example, the input fields 403 to 406 and 408 are text boxes. The input field 407 is a drop-down list. The input field 409 is a set of radio buttons.

When the WWW server 305 receives a transmission request for the HTML document A at step A1, the WWW server 305 transmits the HTML document A (401) to the WWW browser 105 (or 205) (at step A2).

When the WWW browser 105 (or 205) receives the HTML document A (401), the order issuer inputs the order issuer information and the commodity order issuance information except for the order issuer's payment date to the input fields 403 to 409 of the form A (402) of the HTML document A (401) (at step A3). When the submit button 410 is pressed, the order issuer information and the commodity order issuance information except for the order issuer's payment date that have been input to the input fields 403 to 409 of the form A (402) and a start request for a CGI program 1 are submitted from the WWW browser 105 (or 205) to the WWW server 305 (at step A4).

If the reset button 411 is pressed, the contents in the input fields are reset.

When the form A is submitted to the WWW server 305, the WWW server 305 starts the CGI program 1 (at step A5).

The CGI program 1 causes the database 307 to be queried for the ordered commodity using SQL (Structured English Query Language) (as query 1) (at step A6). As a result, the delivery date of the ordered commodity, the regular price thereof, and the maximum discount rate thereof are obtained as data 1 (at step A7). Thereafter, the CGI program 1 causes the database 307 to be queried using the SQL (at step A8). As a result, the due payment date corresponding to the delivery date of the ordered commodity is obtained as data 2 (at step A9). Thereafter, the CGI program 1 sends an HTML document (501) shown in FIG. 4 to the WWW server 305 (at step A10).

Figure 4:
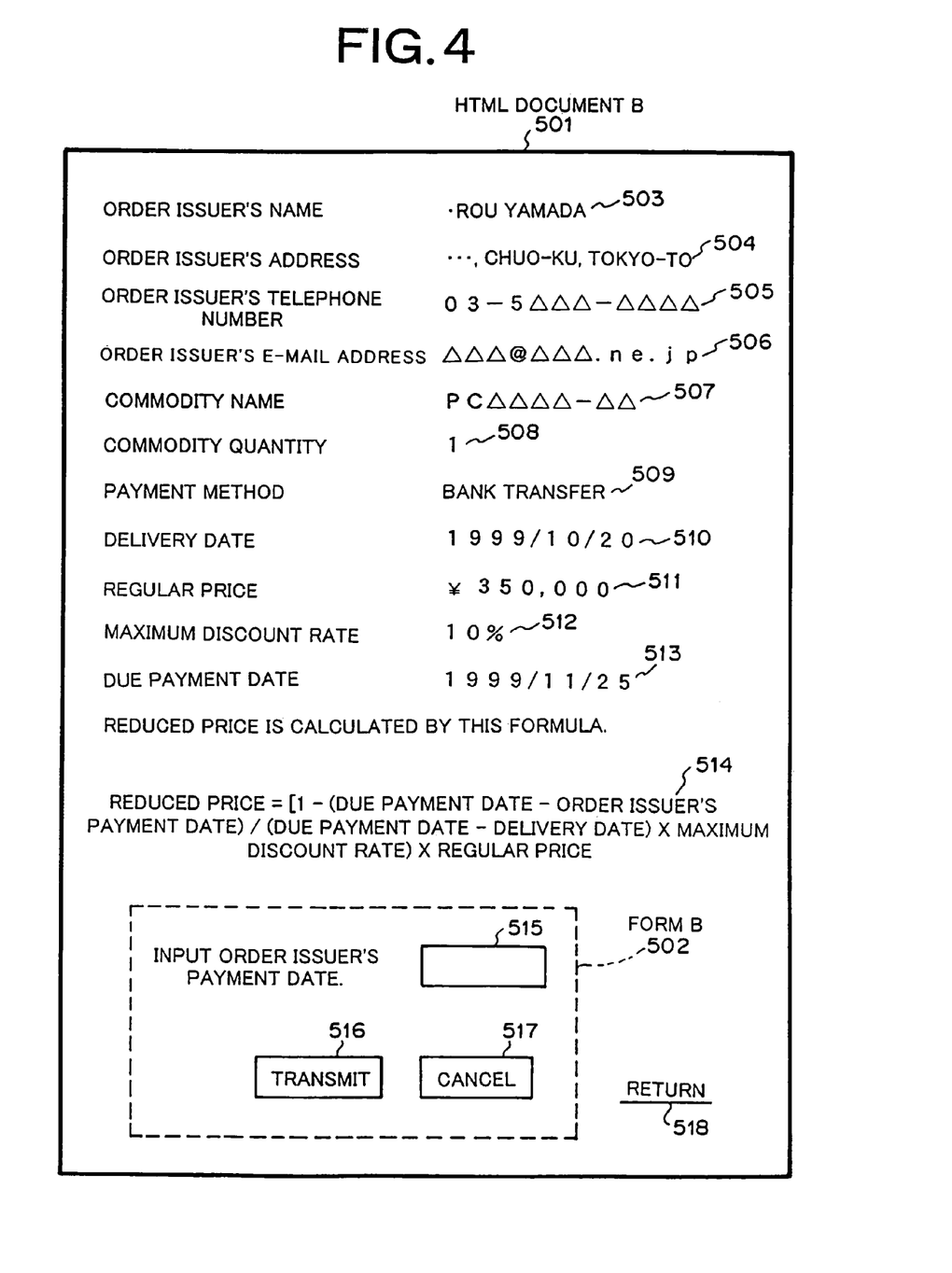
FIG. 4 is a schematic diagram showing an HTML document B according to the embodiment of the present invention.

With reference to FIG. 4, there is described in the HTML document (501) a form B (502). In addition, there are described in the HTML document (501): order issuer information, which includes the order issuer's name 503, the order issuer's address 504, the order issuer's telephone number 505, and the order issuer's e-mail address 506; commodity order issuance information, which includes the order issuance commodity name 507, the order issuance commodity quantity 508, and the payment method 509 and which does not include an order issuer's payment date; the results of queries 1 and 2, which include the order issuance commodity delivery date 510, the regular price 511, the maximum discount rate 512, and the due payment date 513; a reduced price calculation formula 514; and link characters 518 named "RETURN". When the link characters 518 are clicked, the HTML document A (401) returns. Described in the form B (502) are an "order issuer's payment date" input field 515 as a text box, a submit button 516 named "TRANSMIT", and a reset button 517 named "cancel".

When the WWW browser 105 (or 205) receives the HTML document (501), the order issuer checks for the contents of the HTML document (501) including the reduced price calculation formula and then inputs the order issuer's payment date in the input field 515 (at step A12). Thereafter, when the submit button 516 is pressed, information that represents the order issuer's payment date that has been input in the input field 515 and a start request for a CGI program 2 are submitted from the WWW browser 105 (or 205) to the WWW server 305 (at step A13).

When the WWW server 305 receives the information that represents the order issuer's payment date and the start request of the CGI program 2, the WWW server 305 starts the CGI program 2 (at step A14).

Figure 5:
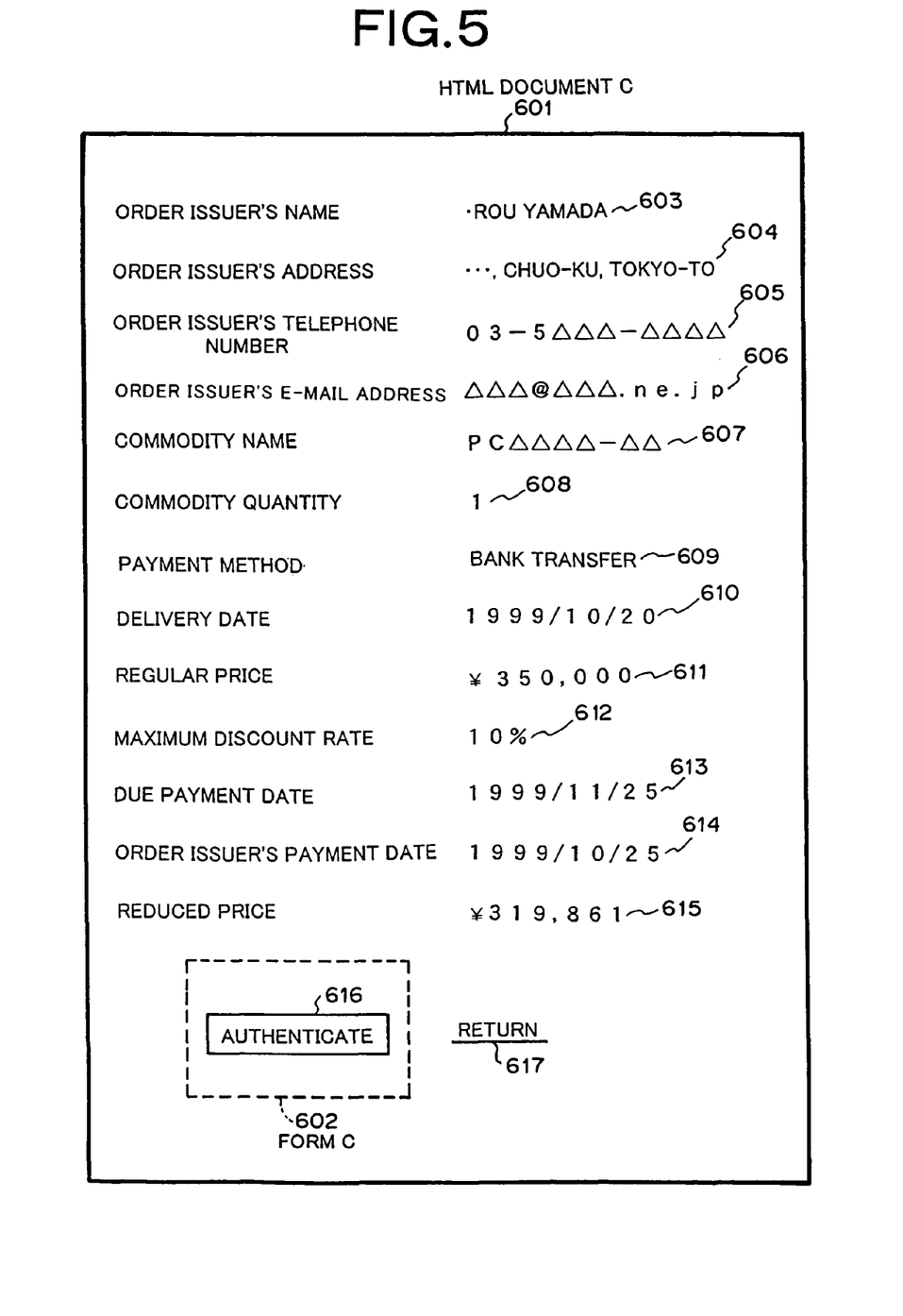
FIG. 5 is a schematic diagram showing an HTML document C according to the embodiment of the present invention.

The CGI program 2 calculates the reduced price using the reduced price calculation formula 514 substituted with the values of the regular price of the commodity, the maximum discount rate, the delivery date, the order issuer's payment date, and the due payment date (at step A15), and then sends an HTML document C (601) shown in FIG. 5 to the WWW server 305.

With reference to FIG. 5, there is described in the HTML document C (601) a form C (602). In addition, there are described in the HTML document C (601): order issuer information, which includes the order issuer's name 603, the order issuer's address 604, the order issuer's telephone number 605, and the order issuer's e-mail address 606; commodity order issuance information, which includes the order issuance commodity name 607, the order issuance commodity quantity 608, the payment method 609, and the order issuer's payment date 614; results of queries 1 and 2, which includes the order issuance commodity delivery date 610, the regular price 611, the maximum discount rate 612, and the due payment date 613; the reduced price 615; and link characters 617. If the link characters 617 are clicked, the HTML document (501) returns. Described in the form C (602) is an authentication button 616 named "AUTHENTICATE".

After the WWW browser 105 (or 205) receives the HTML document C (601), when the order issuer checks for the content of the order issuance commodity and then presses the authentication button 616, a start request for a CGI program 3 is submitted from the WWW browser 105 (or 205) to the WWW server 305.

If the order issuer wants to change the content of the order, he or she clicks the link characters 617 so as to return from the HTML document C (601) to the HTML document (501). Likewise, if the order issuer clicks the link characters 518 on the HTML document (501), the HTML document A (401) returns.

When the WWW server 305 receives the form C at step A18, the WWW server 305 starts the CGI program 3 (at step A19).

The CGI program 3 causes all data described in the HTML document C (601) to be output to the outputting means 308 or recorded to the record medium 309 (at step A20).

There may be described in the form B (502) the order issuer's name, the order issuer's address, the order issuer's telephone number, the order issuer's e-mail address, the commodity name, the commodity quantity, the payment method, the delivery date, the regular price, the maximum discount rate, and the due payment using objects of "TYPE hidden". In this case, these data are submitted along with an order issuer's payment date from the WWW browser 105 (or 205) to the WWW server 305. Likewise, there may described in the form C (503) the order issuer's name, the order issuer's address, the order issuer's telephone number, the order issuer's e-mail address, the commodity name, the commodity quantity, the payment method, the delivery date, the regular price, the maximum discount rate, the due payment date, the order issuer's payment date, and the reduced price using objects of "TYPE=hidden". In this case, these data are submitted from the WWW browser 105 (or 205) to the WWW server 305 (at step A18). In the above case, the CGI program 2 obtains all the items input by the issuer and retrieved from database 307 at the concerned time, and the CGI program 3 obtains all the items input by the issuer and retrieved from database 307 at the concerned time and the reduced price. Alternatively, CGI Side Includes, Netscape Persistence Cookies, or Magic Cookies may be used instead of the above-described method.

According to the embodiment, the reduced price was calculated by the formula:

Reduced price=(1−(due payment date−order issuer's payment date)/(due payment date−delivery date)×maximum discount rate)×regular price Instead, the following formula may be used.

Reduced price=(1−((due payment date−order issuer's payment date)/(due payment date−delivery date))$^2$×maximum discount rate)×regular price As was described above, according to the present invention, after the order issuer knows that the reduced price varies depending on the order issuer's payment date, the order issuer designates the order issuer's payment date. Thus, the order issuer is prompted to designate an early payment date so as to facilitate the cash flow on the order acceptor side.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A commodity order issuing and accepting method, comprising:
   providing an order issuing device capable of electronic communications;
   providing an order accepting device capable of electronic communications;
   requesting a first electronic document comprising first input fields for accepting order issuer information and for accepting commodity order issuance information except for an order issuer's payment date from said order accepting device;
   transmitting said first electronic document to said order issuing device;
   inputting said order issuer information and said commodity order issuance information except for said order issuer's payment date into said first input fields on said order issuing device;
   transmitting said order issuer information and said commodity order issuance information except for said order issuer's payment date to said order accepting device;
   retrieving a transaction condition corresponding to said commodity order issuance information on said order accepting device;
   transmitting a second electronic document on which said transaction condition is described and which has a second input field for said order issuer's payment date to said order issuing device;
   inputting said order issuer's payment date into said second input field on said order issuing device; and
   transmitting said order issuer's payment date to said order accepting device,
   wherein said second electronic document comprises a formula for calculating a payment price based on said order issuer's payment date which is determined by said order issuer, and a due payment date, a delivery date, a maximum discount rate and a regular price which are determined by an order accepter, said formula complying with said transaction condition.

2. The commodity order issuing and accepting method as set forth in claim 1, further comprising:
   calculating said payment price based on said order issuer's payment date which is determined by said order issuer, and the due payment date, the delivery sate, the maximum discount rate and the regular price which are determined by the order accepter on said order accepting device.

3. The commodity order issuing and accepting method as set forth in claim 2, further comprising:
   transmitting a third electronic document on which said payment price is described and which has means for inputting an authentication to said order issuing device;
   activating said means for inputting the authentication on said order issuing device; and
   transmitting information representing that said means for inputting the authentication has been activated to said order accepting device.

4. The commodity order issuing and accepting method of claim 1, wherein the order issuer's payment date is manually entered by a user.

5. The commodity order issuing and accepting method of claim 1, wherein the first electronic document and the second electronic document are in HTML format.

6. The commodity order issuing and accepting method of claim 1, wherein the order issuing device and the order accepting device communicate over the internet.

7. The commodity order issuing and accepting method of claim 1, wherein the transaction condition is a formula related to a commodity transaction.

8. The commodity order issuing and accepting method of claim 1, wherein the order issuer information is at least one of an order issuer's name, an order issuer's address and an order issuer's telephone number.

9. The commodity order issuing and accepting method of claim 1, wherein the commodity order issuance information is at least one of a commodity item and a commodity quantity.

10. The commodity order issuing and accepting method of claim 1, wherein the second electronic document comprises fields displaying a regular payment amount and a payment due date, the regular payment amount being due on the payment due date, and
    wherein the payment amount is determined by the order accepting device.

11. A commodity order issuing and accepting system, comprising:
    means for requesting a first electronic document having first input fields for order issuer information and for commodity order issuance information except for an order issuer's payment date from an order issuer side to an order accepter side;
    means for transmitting said first electronic document from said order accepter side to said order issuer side;
    means for inputting said order issuer information and said commodity order issuance information except for said order issuer's payment date to said first input fields on said order issuer side;
    means for transmitting said order issuer information and said commodity order issuance information except for said order issuer's payment date from said order issuer side to said order accepter side;

means for retrieving a transaction condition corresponding to said commodity order issuance information on said order accepter side;

means for transmitting a second electronic document on which said transaction condition is described and which has a second input field for said order issuer's payment date from said order accepter side to said order issuer side;

means for inputting said order issuer's payment date to said second input field on said order issuer side; and means for transmitting said order issuer's payment date from said order issuer side to said order accepter side, wherein said second electronic document comprises a formula for calculating a payment price based on said order issuer's payment date which is determined by said order issuer, and a due payment date, a delivery date, a maximum discount rate and a regular price which are determined by an order accepter, said formula complying with said transaction condition.

12. The commodity order issuing and accepting system as set forth in claim 11, further comprising:

means for calculating said payment price based on said order issuer's payment date which is determined by said order issuer, and the due payment date, the delivery date, the maximum discount rate and the regular price which are determined by the order accepter on said order accepter side.

13. The commodity order issuing and accepting system as set forth in claim 12, further comprising:

means for transmitting a third electronic document on which said payment price is described and which has means for inputting an authentication from said order accepter side to said order issuer side;

means for activating said means for inputting the authentication on said order issuer side; and means for transmitting information representing that said means for inputting the authentication has been activated from said order issuer side to said order accepter side.

14. The commodity order issuing and accepting system of claim 11, wherein the order issuer's payment date is manually entered by a user.

15. The commodity order issuing and accepting system of claim 11, wherein the first electronic document and the second electronic document are in HTML format.

16. The commodity order issuing and accepting system of claim 11, wherein the order issuing device and the order accepting device communicate over the internet.

17. The commodity order issuing and accepting system of claim 11, wherein the transaction condition is a formula related to a commodity transaction.

18. The commodity order issuing and accepting system of claim 11, wherein the order issuer information is at least one of an order issuer's name, an order issuer's address and an order issuer's telephone number.

19. The commodity order issuing and accepting system of claim 11, wherein the commodity order issuance information is at least one of a commodity item and a commodity quantity.

20. The commodity order issuing and accepting system of claim 11, wherein the second electronic document comprises fields displaying a regular payment amount and a payment due date, the regular payment amount being due on the payment due date, and wherein the payment amount is determined by the order accepting device.

21. A commodity order accepting apparatus, comprising:

means for receiving a request for a first electronic document having first input fields for order issuer information and for commodity order issuance information except for an order issuer's payment date from an order issuer side, means for transmitting said first electronic document to said order issuer side;

means for receiving said order issuer information and said commodity order issuance information except for said order issuer's payment date which have been input to said first input fields on said order issuer side from said order issuer;

means for retrieving a transaction condition corresponding to said commodity order issuance information;

means for transmitting a second electronic document on which said transaction condition is described and which has a second input field for said order issuer's payment date to said order issuer side;

means for receiving said order issuer's payment date which have been input to said second input field on said order issuer side from said order issuer side, wherein said second electronic document comprises a formula for calculating a payment price based on said order issuer's payment date which is determined by said order issuer, and a due payment date, a deliver date, a maximum discount rate and a regular price which are determined by an order accepter, said formula complying with said transaction condition.

22. The commodity order accepting apparatus as set forth in claim 21, further comprising:

means for calculating said payment price said order issuer's payment date which is determined by said order issuer, and the due payment date, the delivery date, the maximum discount rate and the regular price which are determined by the order accepter.

23. The commodity order accepting apparatus as set forth in claim 22, further comprising:

means for transmitting a third electronic document on which said payment price is described and which has means for inputting an authentication to said order issuer side; and means for receiving information representing that said means for inputting the authentication has been activated on said order issuer side from said order issuer side.

24. The commodity order accepting apparatus of claim 21, wherein the order issuer's payment date is manually entered by a user.

25. The commodity order accepting apparatus of claim 21, wherein the first electronic document and the second electronic document are in HTML format.

26. The commodity order accepting apparatus of claim 21, wherein the order issuing device and the order accepting device communicate over the internet.

27. The commodity order accepting apparatus of claim 21, wherein the transaction condition is a formula related to a commodity transaction.

28. The commodity order accepting apparatus of claim 21, wherein the order issuer information is at least one of an order issuer's name, an order issuer's address and an order issuer's telephone number.

29. The commodity order accepting apparatus of claim 21, wherein the commodity order issuance information is at least one of a commodity item and a commodity quantity.

30. The commodity order accepting apparatus of claim 21, wherein the second electronic document comprises fields displaying a regular payment amount and a payment due date, the regular payment amount being due on the payment due date, and wherein the payment amount is determined by the order accepting device.

31. A commodity order accepting apparatus, comprising:
a receiving module for receiving communications from an order issuing device;
a transmitting module for transmitting communications to the order issuing device; and
a retrieving module,
wherein the receiving module, the transmitting module and retrieving module are configured such that:
when the receiving module receives a request for a first electronic document comprising first input fields for accepting order issuer information and for accepting commodity order issuance information except for an order issuer's payment date from an order issuing device, the transmitting module transmits said first electronic document to said order issuing device,
when the receiving module receives said order issuer information and said commodity order issuance information except for said order issuer's payment date from said order issuing device, the retrieving module retrieves a transaction condition corresponding to said commodity order issuance information and the transmitting module transmits a second electronic document on which said transaction condition is described and which has a second input field for said order issuer's payment date to said order issuing device,
the receiving module receives said order issuer's payment date from said order issuing device, and
wherein said second electronic document comprises a formula for calculating a payment price based on said order issuer's payment date which is determined by said order issuer, and a due payment date, a delivery date, a maximum discount rate and a regular price which are determined by an order accepter, said formula complying with said transaction condition.

32. The commodity order accepting apparatus of claim 31, comprising:
a calculating module,
wherein the calculating module is configured to calculate said payment price based on said order issuer's payment date which is determined by said order issuer, and the due payment date, the delivery date, the maximum discount rate and the regular price which are determined by the order accepter.

33. The commodity order accepting apparatus of claim 32, wherein the transmitting module is configured to transmit a third electronic document on which said payment price is described and which has means for inputting an authentication to said order issuing device, and
wherein the receiving module is configured to receive information representing that said means for inputting the authentication has been activated on said order issuing device.

34. The commodity order accepting apparatus of claim 31, wherein the order issuer's payment date is manually entered by a user.

35. The commodity order accepting apparatus of claim 31, wherein the first electronic document and the second electronic document are in HTML format.

36. The commodity order accepting apparatus of claim 31, wherein the order issuing device and the order accepting device communicate over the internet.

37. The commodity order accepting apparatus of claim 31, wherein the transaction condition is a formula related to a commodity transaction.

38. The commodity order accepting apparatus of claim 31, wherein the order issuer information is at least one of an order issuer's name, an order issuer's address and an order issuer's telephone number.

39. The commodity order accepting apparatus of claim 31, wherein the commodity order issuance information is at least one of a commodity item and a commodity quantity.

40. The commodity order accepting apparatus of claim 31, wherein the second electronic document comprises fields displaying a regular payment amount and a payment due date, the regular payment amount being due on the payment due date, and
wherein the payment amount is determined by the order accepting device.

41. A commodity order issuing and accepting method, comprising:
providing an order issuing device capable of electronic communications;
providing an order accepting device capable of electronic communications;
requesting a first electronic document comprising first input fields for accepting order issuer information comprising information about an order issuer, and for accepting commodity order issuance information except for said order issuer's payment date from said order accepting device;
transmitting said first electronic document to said order issuing device;
inputting said order issuer information and said commodity order issuance information except for said order issuer's payment date into said first input fields on said order issuing device;
transmitting said order issuer information and said commodity order issuance information except for said order issuer's payment date to said order accepting device;
retrieving a transaction condition corresponding to said commodity order issuance information on said order accepting device;
transmitting a second electronic document on which said transaction condition is described and which has a second input field for said order issuer's payment date to said order issuing device;
inputting said order issuer's payment date into said second input field on said order issuing device;
transmitting said order issuer's payment date to said order accepting device, and
wherein said second electronic document comprises a formula for calculating a payment price based on said order issuer's payment date which is determined by said order issuer, and a due payment date, a deliver date, a maximum discount rate and a regular price which are determined by an order accepter, said formula complying with said transaction condition.

42. The commodity order issuing and accepting method of claim 41, wherein the commodity order issuance information is at least one of a commodity item and a commodity quantity.

43. The commodity order issuing and accepting method of claim 41, wherein the second electronic document comprises fields displaying a regular payment amount and a payment due date, the regular payment amount being due on the payment due date, and
wherein the payment amount is determined by the order accepting device.

* * * * *